United States Patent [19]
Allen et al.

[11] Patent Number: 6,063,291
[45] Date of Patent: May 16, 2000

[54] DEWATERING OF AQUEOUS SUSPENSIONS

[75] Inventors: Anthony Peter Allen, West Yorkshire; Philip McColl, Huddersfield; George Thomas Staines, Northumberland, all of United Kingdom

[73] Assignee: Ciba Specialty Chemicals Water Treatments Limited, West Yorkshire, United Kingdom

[21] Appl. No.: 09/011,024

[22] PCT Filed: Aug. 7, 1996

[86] PCT No.: PCT/GB96/01917

§ 371 Date: Feb. 5, 1998

§ 102(e) Date: Feb. 5, 1998

[87] PCT Pub. No.: WO97/06111

PCT Pub. Date: Feb. 20, 1997

[30] Foreign Application Priority Data

Aug. 8, 1995 [GB] United Kingdom .................. 9516254

[51] Int. Cl.[7] ..................................................... B01D 21/01
[52] U.S. Cl. ........................ 210/727; 210/728; 210/734
[58] Field of Search ................................ 210/727, 725, 210/728, 734, 723

[56] References Cited

U.S. PATENT DOCUMENTS

| | | | |
|---|---|---|---|
| 3,539,510 | 11/1970 | Priesing et al. | 210/52 |
| 4,489,180 | 12/1984 | Lundberg et al. | 523/175 |
| 4,943,378 | 7/1990 | Flesher et al. | 210/734 |
| 5,112,500 | 5/1992 | Jones | 210/734 |
| 5,130,358 | 7/1992 | Danner | 524/140 |
| 5,338,406 | 8/1994 | Smith | 162/168.2 |
| 5,529,588 | 6/1996 | Sommese et al. | 210/727 |

FOREIGN PATENT DOCUMENTS

| | | |
|---|---|---|
| 60-202787 | 3/1984 | Japan . |
| 6-129200 | 7/1985 | Japan . |
| 2118926 | 11/1983 | United Kingdom . |
| 92/00248 | 1/1992 | WIPO . |

OTHER PUBLICATIONS

International Search Report.

*Primary Examiner*—David A. Simmons
*Assistant Examiner*—Frank M. Lawrence
*Attorney, Agent, or Firm*—David R. Crichton

[57] ABSTRACT

Belt pressing or other pressure dewatering of a high solids mineral suspension is facilitated by flocculating the suspension by mixing into the suspension anionic flocculant having IV at least 5 dl/g and a minor amount of a cationic flocculant which generally has IV at least 4 dl/g. The flocculants are normally such that counterionic precipitation occurs.

10 Claims, No Drawings

DEWATERING OF AQUEOUS SUSPENSIONS

This invention relates to the dewatering of high solids mineral suspensions utilising anionic and cationic flocculant.

It is well known to dewater a high solids mineral suspension, for instance a suspension having a solids content of above 150 g/l, by mixing into the suspension polymeric flocculant, allowing the suspension to flocculate and then dewatering the flocculated suspension under pressure, for instance on a belt press. Conventionally, the flocculant is an anionic bridging polymeric flocculant having intrinsic velocity at least 5 dl/g. For instance, it is common to use high molecular weight copolymers of sodium acrylate and acrylamide. The use of sulphonate polymers is known from for instance U.S. Pat. Nos. 4,342,953, 4,704,209 and GB 2,268,422.

There is extensive literature, as discussed in more detail below, indicating that there are various situations when it is desirable to flocculate a suspension utilising both anionic polymer and cationic polymer. Often, the cationic polymer is the major component. In some instances both polymers are high molecular weight bridging flocculants while in others one of the polymers is a bridging flocculant and the other is a lower molecular weight flocculant, for instance of the type that would often be referred to as a coagulant.

In particular, when dewatering high solids mineral suspensions it is known to use high molecular weight anionic bridging flocculant followed by low molecular weight cationic flocculant, often referred to as a coagulant. Thus it is common to add a dilute aqueous solution of a high molecular weight anionic flocculant to the suspension, mix this flocculant into the high solids mineral suspension and then add a dilute aqueous solution of a low molecular weight cationic coagulant before dewatering on the belt press or otherwise.

In the various processes where counterionic flocculants are used, normal practice is to provide the counterionic flocculants as individual solutions and to keep these solutions separate from one another prior to addition to the suspension which is to be treated. This is because many combinations of counterionic flocculants, when mixed in solution, will tend to form a gelatinous precipitate due to counterionic precipitation occurring. In WO92/00248 counterionic flocculants of this type are added as a mixed powder direct into a suspension which is to be flocculated, so that they dissolve in the suspension. Unfortunately this necessitates prolonged mixing of the suspension because of the relatively slow rate of dissolution of high molecular weight bridging flocculants, and this prolonged mixing can be undesirable and wasteful of energy, especially when dealing with a high solids mineral suspension.

When dewatering other suspensions, it is known to formulate blends of anionic and cationic polymers under particular conditions which prevent counterionic precipitation occurring. For instance the presence of free acid and/or added inorganic electrolyte can reduce the risk of counterionic precipitation occurring, and careful selection of the proportions of the counterionic polymers can also minimise the risk of precipitation.

Unfortunately, this dictates that the polymers are selected for their solubility properties rather than, as is normally preferred, for their performance in the flocculation process. For instance in U.S. Pat. No. 3,539,510 the problem of counterionic precipitation is noted and is avoided by using, as the cationic polymer, a polymer which is substantially free of quaternary ammonium groups.

Disclosures of various other processes using both cationic and anionic polyelectroltyes are in DE-A-4421455, JP-A-05038404, JP-A-62129200, JP-A-62289300, JP-A-04300700, JP-A-63252600, CA-A-2041627, JP-A-02009500, JP-A-63012792, JP-A-62125893, JP-A-61234999, JP-A-61200897, JP-A-61054300 and JP-A-58215454 and GB-A-1549874, and Khim Tverd Topl (Moscow) 1976, 3, 57–64.

None of these alter the general situation which is that conventional blends of quaternary ammonium cationic and sodium anionic high molecular weight polymers should generally be avoided because of precipitation during dissolution, and that dewatering of high solids mineral suspension is best performed using a solution of high molecular weight, water-soluble anionic bridging polymeric flocculant followed by a solution of low molecular weight water-soluble cationic flocculant or coagulant.

The object of the present invention is to improve the dewatering of high solids mineral suspensions, especially as regards the speed of drainage or dewatering. This is preferably achieved utilising a single flocculant material.

A process according to the invention for pressure dewatering an aqueous mineral suspension having a mineral solids content of at least 150 g/l comprises mixing into the suspension water-soluble anionic bridging polymeric flocculant having intrinsic viscosity at least 5 dl/g and water-soluble cationic polymeric flocculant, allowing the suspension to flocculate, and dewatering the flocculated suspension under pressure, and in this process the anionic and cationic flocculants are mixed into the suspension by blending one part by weight of the cationic polymeric flocculant with 2 to 20 parts by weight of the anionic polymeric bridging flocculant and sufficient water to give a polymer concentration of below 5% and under conditions whereby counterionic precipitation can occur and thereby forming an aqueous composition in which substantially all the anionic polymer which is not precipitatable by the cationic polymer is in solution, and mixing this aqueous composition into the suspension.

Thus in the invention we deliberately use materials which will undergo counterionic precipitation, we have an excess of the anionic flocculant so that a significant amount of anionic flocculant can be in solution irrespective of the amount of counterionic precipitation, and then we mix the resultant aqueous composition into the high solids suspension.

When activating polymer with water (i.e. dissolving the polymer) prior to adding it to a suspension, normal practice requires that the activated aqueous composition should be as homogeneous as possible and should contain substantially no visible evidence of precipitated or gelatinous material. In the invention, however, we find that improved performance is obtained even though the aqueous composition, on close examination, may be seen to be less homogeneous, often substantially less homogeneous, than would normally thought to be desirable.

We believe that what is happening is that the anionic polymer flocculant initially goes substantially wholly into solution but some of it is then precipitated onto or with the cationic flocculant to form a precipitate (which may be colloidal or larger). We believe that it is beneficial to add the aqueous composition to the mineral suspension while the aqueous composition contains both the dissolved anionic flocculant and the precipitate containing cationic flocculant and some of the anionic flocculant.

In order to mix the resultant aqueous composition into the high solids suspension, it is necessary to apply the conventional vigorous mixing which is always associated with distributing aqueous flocculant into a high solids suspension, such as screw mixing. This conventional vigorous mixing necessarily involves the application of high turbulence, agitation and shear to the combination of suspension and aqueous flocculant composition. We believe that this conventional high shear mixing initially distributes the dissolved anionic flocculant through the suspension and initiates flocculation of that but then gradually degrades the precipitate and releases cationic flocculant into the suspension.

Whatever the mechanism, the process of the invention results in an unusual floc structure and in accelerated and improved dewatering of the suspension. Thus, the invention gives improved dewatering compared to the use of dissolved anionic polymer alone or dissolved anionic polymer followed by the conventional low molecular weight cationic polymer solution.

The aqueous composition generally has a total polymer content (i.e. anionic+cationic) of 0.001 to 5% by weight, more usually around 0.01 to 1% by weight. Either polymer can be supplied, for incorporation in the aqueous composition, as a preformed solution but generally the polymers are supplied initially as powders or reverse phase emulsions (which may be anhydrous). Accordingly the aqueous composition is generally formed by mixing into water the polymers in powder form or the polymers in emulsion form. Preferably the aqueous composition is formed by mixing into water the polymers in powder form. It seems that in preferred processes, especially when the cationic polymer has IV above 4, the anionic polymer dissolves first and forms a precipitate around the dissolving cationic polymer, thereby impeding dissolution of this.

The polymers may be mixed sequentially or simultaneously into the water which is to provide the aqueous composition but generally they are mixed simultaneously. Preferably they are provided as a preformed blend of the polymers, and this blend is mixed into water. Thus preferably the polymers are supplied as a blend of cationic polymer powder and anionic polymer powder and this blend is mixed with sufficient dilution water to form the aqueous composition having a polymer content of below 5% in which the anionic flocculant is dissolved.

The mixing of the polymers into water to form the aqueous composition may be performed in conventional make-up apparatus. After initial mixing and before addition to the suspension it is generally preferred to allow the dilute aqueous composition to age, optionally with mixing, to allow substantially all of the anionic polymer to go into solution. This may require ageing for instance for at least 10 minutes, and often at least 30 minutes, and frequently at least an hour when either or both polymers is supplied as a powder.

It is not essential that all the polymeric material goes fully into the mixed solution before addition to the suspension. In particular the cationic polymer may not dissolve fully. It is also not essential that no gelation or precipitation be observed on mixing. In fact, we find that a composition which can be seen to be a non-homogeneous product gives improved results. Suitable mixing times and conditions for any particular combination of polymers can be determined by experimentation.

The anionic polymer should be substantially completely dissolved, in the sense that little or none of it should remain in its initial undissolved powder or emulsion form and instead it should substantially all have gone into solution although some will have been incorporated into a counterionic precipitate. In practice it is generally desirable that at least 50% by weight, and preferably at least 75% by weight of the amount of anionic polymer which is introduced into the aqueous composition should be in solution, i.e. available to initiate flocculation as soon as the aqueous composition is mixed into the mineral suspension.

The cationic polymer must be added in a lesser amount than the anionic polymer. Preferably the ratio of anionic polymer to cationic polymer is 20:1 to 2:1 by weight, more preferably from 15:1 to 2:1, most preferably 12:1 to 4:1, often about 9:1 by weight.

The amount of cationic polymer is always relatively small compared to the amount of anionic polymer, and it is generally preferred that the process is conducted so that the anionic polymer forms a type of coacervate or precipitate around the cationic polymer. Accordingly it can be seen that only a very small proportion of the anionic polymer will enter into a precipitate and, instead, the majority can be in true solution in the aqueous composition.

The anionic polymer may be a water-soluble homopolymer of water-soluble ethylenically unsaturated anionic monomer, or it may be a water-soluble copolymer of a water-soluble ethylenically unsaturated anionic monomer blend. Generally at least 3 wt %, often at least 5, 10 or 15 wt % but generally not more than 50 or 60 wt % of the monomers are anionic with any other monomers being non-ionic.

Preferred anionic monomers are ethylenically unsaturated carboxylic or sulphonic acids, generally as their water-soluble alkali metal salts. Examples are 2-acrylamido-2-methyl propane sulphonic acid (AMPS, US trade mark), methacrylic acid and acrylic acid (as sodium or other alkali metal salt). Sodium acrylate is usually preferred.

Suitable water-soluble ethylenically unsaturated non-ionic comonomers include acrylamide or methacrylamide.

Preferred anionic polymers are copolymers of acrylamide and, usually, 20 to 60% by weight sodium acrylate. Alternatives include homopolymers of sodium acrylate and copolymers of acrylamide and AMPS, in particular copolymers of AMPS and up to 97 wt %, often up to 95 wt %, (meth) acrylamide. A blend of polymers may be used.

The anionic polymeric material should be water-soluble and should be a high molecular weight bridging flocculant having intrinsic viscosity (IV) of at least about 5, preferably at least 8, often at least 10 dl/g. IV may be as high as 30 dl/g or greater and is often in the range 10 to 20 dl/g.

Intrinsic viscosity is measured by suspended level viscometer in buffered pH7 1N NaCl at 25° C.

The cationic polymeric material may be a homopolymer or a copolymer of two or more monomer types. It may be a mixture of two or more polymers. The polymer may be a naturally occurring cationic polymeric material or a modified naturally occurring cationic polymer, but is preferably a synthetic polymer.

The cationic polymer is usually formed from a water-soluble ethylenically unsaturated monomer or monomer blend.

The polymer may be formed from monomers of which substantially 100% are water-soluble cationic ethylenically unsaturated monomers. It is preferably formed from a water-soluble blend of cationic and non-ionic ethylenically unsaturated monomers.

Suitable cationic monomers include dialkylaminoalkyl (meth)-acrylates and -acrylamides, as acid addition or, preferably, quaternary ammonium salts, and diallyl dialkyl ammonium halides. Preferred acrylates and (meth) acrylates are di-$C_{1-4}$ alkylaminoethyl (meth) acrylates and preferred acrylamides are di-$C_{1-4}$ alkylaminopropyl (meth) acrylamides, in particular dimethylaminoethyl (meth) acrylates (DMAE(M)A) and dimethylaminopropyl (meth) acrylamide (DMAP(M)A), with the respective methacrylate and methacrylamide compounds being particularly preferred, as acid addition, and preferably, quaternary ammonium salts. The preferred diallyl dialkyl ammonium halide is diallyl dimethyl ammonium chloride (DADMAC).

The preferred cationic polymers are copolymers of dialkylaminoalkyl-(meth)acrylate and -(meth)acrylamide monomers with acrylamide or other non-ionic monomer. The amount of cationic monomer is usually 10 to 80%, often 10 to 60%, by weight with the remainder usually being acrylamide or other water-soluble ethylenically unsaturated monomer.

The cationic polymer is preferably a high molecular weight bridging flocculant, typically having intrinsic viscosity at least 4 dl/g and preferably at least 6 and typically up to 12 or even 17 dl/g or higher.

In some instances, however, satisfactory results are obtained when the ionic content and the molecular weight of the cationic polymeric material are such that it may be regarded as a coagulant rather than a bridging flocculant. It is then preferred for at least 50 wt %, generally at least 80 wt %, of the monomers from which it is formed to be cationic. Polymers in which 100% of the monomers are cationic are then preferred.

In particular polydiallyldimethyl ammonium chloride (polyDADMAC) is preferred. Copolymers of DADMAC which contain up to 30 wt % acrylamide are also useful. Other suitable low molecular weight polymers include polyethylene imine and polyamines, such as polyamine epichlorohydrin reaction products. These low molecular weight polymers generally have IV below 3, preferably below 2.4 dl/g, but usually above 0.2 or 0.5 dl/g, for instance 0.8 to 1.5 dl/g. Measured by GPC, the molecular weight is usually above 50,000 and often above 100,000 but frequently below 1,000,000 or 3,000,000.

Both the anionic and cationic polymeric materials are essentially water-soluble, but either polymeric material may be of the type described in EP 202,780 containing a soluble fraction and a particulate insoluble fraction having a particle size below 10 μm.

An advantage of the invention is that the flocculants are not restricted by considerations of compatibility and thus it is not necessary to use, for instance, free base cationic or free acid anionic flocculants in an attempt at minimising incompatibility, and it is not necessary to add acid, salt or other additives in order to minimise incompatibility. Instead, the flocculants can be the conventionally available flocculants mixed under conditions whereby counterionic precipitation can occur, that is to say some degree of non-homogeneity will be seen to exist if the defined amounts of the selected polymers are activated gently, without application of sufficient shear to disperse any counterionic precipitate which is formed.

In practice, the invention is best performed by using anionic flocculant in which most or all (e.g. above 50% molar and usually above 80% molar) of the anionic groups are in alkali metal salt form (or other water-soluble salt form) and cationic amino polymeric flocculant wherein most or all (above 50% and usually above 80%) of the amino groups are in the form of quaternary ammonium salt groups, both polymers having IV above 4 or 5 dl/g, as discussed above, so that they are both bridging flocculants.

The preferred process of the invention uses a blend of a bridging copolymer of acrylamide and sodium acrylate with a bridging quaternised copolymer of acrylamide and dialkylamino ethyl(meth)acrylate.

For the purposes of this invention, it can be assumed that the defined blends of excess of the sodium or other alkali metal form of the anionic bridging flocculant with a minor amount of the quaternary bridging cationic flocculant are blends which will give counterionic precipitation unless compatibilising components are added to minimise this, and in the invention these are unnecessary. A single addition of anionic and cationic polymer can give better results than is obtainable in prior art processes using sequential addition of high molecular weight anionic flocculant followed by cationic coagulant.

Although the pressure dewatering can be conducted by vacuum filtering or by filter pressing, best results are obtained by centrifugation or, especially belt pressing.

Thus the preferred process of the invention comprises mixing into water a powder blend of a sodium form anionic bridging flocculant and a quaternary salt form of a cationic bridging flocculant and allowing the anionic flocculant to substantially entirely dissolve, thoroughly mixing the resultant aqueous composition into a high solids mineral suspension and allowing the suspension to flocculate, and then belt pressing the flocculated suspension and thereby dewatering it.

The polymers which are used in the invention can be made by conventional techniques. For instance, the powders may be made by bulk gel polymerisation followed by comminution and drying or by reverse phase bead polymerisation followed by drying and optionally comminution.

The process may be carried out batchwise but generally the aqueous flocculant composition is added to a flowing stream of the suspension. Thus the suspension is in the form of a flowing stream which is often caused to flow turbulently along a duct from the position at which the aqueous flocculants are added to the position at which flocculation begins. For instance this flow can be along a simple duct (optionally a ditch or a launder provided with baffles to create extra turbulence) or it can be along a series of ducts, for instance including some substantially downwardly extending ducts so as to promote extra turbulence. Often flow is into a closed pipe containing one or more orifice plates.

Alternatively or additionally, mechanical mixers, such as screw mixers, may be provided.

We believe that the thorough mixing of the flocculant into the high solids mineral suspension is important, and if inferior results are obtained in a process it may be desirable to increase the shear applied during the mixing.

Dosing of the aqueous flocculants into the suspension can be effected in a manner conventional for liquid flocculants. Normally it is adjusted so as to give substantially constant dosage of the flocculant polymers per unit volume of the suspension. Generally the flocculant is added in an amount such that the suspension contains at least 50 grams total flocculant polymers per tonne dry mineral solids (50 ppm), preferably at least 140 ppm but usually not more than 400 ppm although higher doses of up to 1,000 ppm or more can be used.

After addition of the mixed aqueous flocculant and initial flocculation of the suspended mineral material it may be appropriate to add, as is conventional, a low molecular weight cationic coagulant type flocculant, such as polyDADMAC or a polyamine epichlorohydrin reaction product before dewatering. However, one of the advantages of the process of the invention is that this final cationic addition is usually unnecessary.

Aqueous suspensions of mineral material which may be treated using the process of the present invention include coal based slurries such as barrel wash effluents, tailings, coal slurries and screen underflows. Tailings and barrel wash effluents in particular are suitable. These are usually dewatered using a belt press. The process may also be used for sand effluents, limestone effluents, china clay, calcium carbonate and other mineral substrates.

The following are Examples.

EXAMPLE 1

The following polymers are used: Polymer A=high molecular weight (IV 14 dl/g) 35% sodium acrylate/65% acrylamide copolymer in the form of a powder produced by bead polymerisation. Polymer B=high molecular weight (IV 7 dl/g) 60% DMAEA quaternised with methyl chloride/ 40% acrylamide copolymer in the form of a powder produced by bead polymerisation.

Polymers A and B are added to water in a weight ratio A:B of 9:1. The aqueous mixture is stirred to ensure dissolution of the Polymer A. Polymer B does not dissolve completely but remains present as particles of gel.

The mixed aqueous flocculant produced is added to a flowing stream of coal effluent slurry in an amount of 250 ppm total polymer.

The flowing slurry is mixed under high shear and allowed to flocculate.

The flocculated suspension is then dewatered on a belt press. The process shows very rapid drainage prior to pressure dewatering in comparison with that generally seen using anionic flocculant alone. It is also found that the floc structure appears different from that obtained with anionic flocculant alone.

EXAMPLE 2

In this Example, a process such as is summarised in Example 1 is described in detail and is compared to two other processes. Example 2a demonstrates the conventional prior art use of polymer A alone on a belt press, while Example 2b demonstrates the conventional prior art use of polymer A followed by low molecular weight cationic polymer, and Example 2c demonstrates the process of the invention.

Example 2a (Comparative)

Method: 450.0±0.5 g samples of a coal slurry of 408 g/l solids and specific gravity 1.23 are added to 600 ml tall form beakers and stirred using a mechanical gate stirrer to ensure homogeneity. Product A is added as a 0.1% w/w solution to give a dose of 200 mg/l and mixing is allowed for the times indicated in Table 1. The treated sample is transferred into the chamber of a belt press simulation apparatus and allowed to dewater under gravity for 60 seconds. Filtrate volumes are noted at 30 (Filtrate vol 1) and 60 seconds (Filtrate vol 2). The top belt is carefully lowered into the chamber of the belt press simulator and the following filtration cycle is carried out: 0–15 seconds at 3 psi, 15–30 seconds at 6 psi, 30–45 seconds at 9 psi, 45–53 seconds at 12 psi, 53–60 seconds at 18 psi and 60–68 seconds at 24 psi. On completion of the cycle, the pressure is released. The cake is removed, weighed, dried at 105° C. and reweighted to determine wet cake solids and cake yield. Cake release and belt condition are visually assessed and rated as very poor (VP), poor (P), fair (F), fair to good (F/G), good (G) or excellent (E).

TABLE 1

| Mixing time(s) | % Yield | % Solids | Cake Release | Belt Condition | Filtrate vol 1/ml | Filtrate vol 2/ml |
| --- | --- | --- | --- | --- | --- | --- |
| 30 | 89.7 | 51.9 | P | P | 70 | 85 |
| 40 | 92.9 | 54.7 | P | P | 75 | 90 |
| 50 | 93.5 | 56.3 | P | P | 90 | 100 |
| 60 | 95.4 | 58.1 | F/G | F/G | 110 | 130 |

Table 1 shows that using anionic flocculant alone produces benefits in performance with increase in mixing time.

Example 2b (Comparative)

The same method as for Example 2a is used except that after addition of 200 mg/l of Product A followed by 30 seconds mixing Product D is added as a 1.0% w/w solution at the doses indicated in Table 2 followed by 10 seconds mixing. Product D=low molecular weight 100% polyamine homopolymer in the form of a solution.

TABLE 2

| Dose ml/l | % Yield | % Solids | Cake Release | Belt Condition | Filtrate vol 1/ml | Filtrate vol 2/ml |
| --- | --- | --- | --- | --- | --- | --- |
| 6 | 91.2 | 53.0 | P | P | 60 | 80 |
| 22 | 92.3 | 54.8 | P | P | 70 | 90 |
| 35 | 94.3 | 57.8 | G | G | 80 | 90 |
| 50 | 95.8 | 59.1 | G | G | 75 | 105 |
| 100 | 96.4 | 60.4 | G | G | 90 | 115 |
| 150 | 97.0 | 59.8 | E | G | 95 | 125 |
| 200 | 96.9 | 61.1 | E | G | 105 | 135 |

Table 2 shows that using a conventional anionic flocculant followed by cationic coagulant addition produces benefits in performance with increase in coagulant dose.

Example 2c (Invention)

The same method as for Example 2a is used except that a blend of polymers A and B in a weight ratio A:B of 9:1 is added as a 0.1% w/w solution to give a dose of 222 mg/l and mixing is allowed for the times indicated in Table 3.

TABLE 3

| Mixing time(s) | % Yield | % Solids | Cake Release | Belt Condition | Filtrate vol 1/ml | Filtrate vol 2/ml |
| --- | --- | --- | --- | --- | --- | --- |
| 5 | 81.8 | 45.2 | VP | VP | 10 | 20 |
| 15 | 89.4 | 49.0 | P | P | 25 | 45 |
| 30 | 96.4 | 60.0 | G | G | 100 | 120 |
| 40 | 98.0 | 62.2 | E | G | 125 | 140 |

Table 3 shows that with normal mixing the blend significantly improves the performance of anionic flocculant on its own and outperforms the conventional anionic flocculant followed by cationic coagulant using a significantly lower cationic addition.

EXAMPLE 3

Polymer A is added to water together with Polymer C (a polyDADMAC of IV 1.4 dl/g, in the form of beads of which 90% by weight have a particle size from 200 to 800 μm produced by reverse phase bead polymerisation) in a weight ratio A:C of 9:1.

What is claimed is:

1. A process for pressure dewatering an aqueous mineral suspension having a mineral solids content of at least 150 g/l comprising mixing into the suspension water-soluble anionic bridging polymeric flocculant having intrinsic viscosity at least 5 dl/g and water-soluble cationic polymeric flocculant, wherein the anionic flocculant is in the form of a water-soluble alkali metal salt and the cationic flocculant is in the form of a water-soluble quaternary ammonium salt, allowing the suspension to flocculate and dewatering the flocculated suspension under pressure, wherein the anionic and cationic flocculants are mixed into the suspension by blending 1 part by weight of the cationic polymeric flocculant with 2 to 20 parts by weight of the anionic polymeric flocculant and sufficient water to give a polymer concentration of below 5% by weight and under conditions whereby counterionic precipitation occurs and thereby forming an aqueous composition in which substantially all the anionic polymer which is not precipitated by the cationic polymer is in solution and wherein the precipitate has formed around the dissolving cationic polymer, and mixing this aqueous composition into the suspension.

2. A process according to claim 1 in which the aqueous composition is formed by mixing into water the cationic and anionic polymers in powder form or in emulsion form.

3. A process according to claim 1 in which the aqueous composition is formed by mixing into water a powder blend of the cationic and anionic polymers.

4. A process according to claim 1 in which the cationic flocculant is a water-soluble polymeric bridging flocculant having intrinsic viscosity at least 4 dl/g.

5. A process according to claim 1 in which the anionic flocculant has intrinsic viscosity 8 to 30 dl/g and the cationic flocculant has intrinsic viscosity 6 to 17 dl/g.

6. A process according to claim 1 in which the dewatering is by belt pressing.

7. A process according to claim 1 in which the amount of anionic flocculant is 4 to 12 parts per part by weight cationic flocculant.

8. A process according to claim 1 in which the anionic flocculant is a copolymer of 3 to 100% by weight ethylenically unsaturated carboxylic or sulphonic monomer and 0 to 97% by weight acrylamide.

9. A process according to claim 1 in which the cationic flocculant is a copolymer of 10 to 80% ethylenically unsaturated cationic monomer and 20 to 90% by weight acrylamide.

10. A process for dewatering an aqueous mineral suspension having a mineral solids content of at least 150 g/l comprising mixing into water a powder blend of a powdered water-soluble anionic flocculant having intrinsic viscosity at least 5 dl/g and which is in the form of an alkali metal salt and a powdered water-soluble cationic flocculant having intrinsic viscosity at least 4 dl/g and which is in the form of quaternary ammonium salt wherein the amount of anionic flocculant is 2 to 20 parts per part by weight cationic flocculant and thereby forming an aqueous composition in which substantially all the anionic flocculant is in solution, mixing this aqueous composition into the suspension and allowing the suspension to flocculate, and dewatering the flocculated suspension by belt pressing.

* * * * *